(12) United States Patent
Yamano et al.

(10) Patent No.: US 6,625,365 B2
(45) Date of Patent: Sep. 23, 2003

(54) OVERCOATED FIBER FOR USE IN OPTICAL FIBER CABLE

(75) Inventors: Masayoshi Yamano, Yokohama (JP); Yoshiyuki Suetsugu, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 291 days.

(21) Appl. No.: 09/788,668

(22) Filed: Feb. 21, 2001

(65) Prior Publication Data

US 2001/0028776 A1 Oct. 11, 2001

Related U.S. Application Data

(63) Continuation-in-part of application No. 09/075,179, filed on May 11, 1998, now abandoned.

(30) Foreign Application Priority Data

May 9, 1997 (JP) .............................................. 9-118555
Dec. 8, 1997 (JP) .............................................. 9-336219

(51) Int. Cl.[7] .............................. G02B 6/02; G02B 6/00; G02B 6/22
(52) U.S. Cl. ........................................ 385/128; 385/122
(58) Field of Search ................................ 439/128, 100, 439/106, 108, 112, 114, 122

(56) References Cited

U.S. PATENT DOCUMENTS

| 4,778,244 A | * | 10/1988 | Ryan | 385/100 |
| 5,486,378 A | * | 1/1996 | Oestreich et al. | 427/163.2 |
| 6,028,976 A | * | 2/2000 | Sato et al. | 385/114 |
| 6,490,394 B1 | * | 12/2002 | Beall et al. | 385/39 |

FOREIGN PATENT DOCUMENTS

| EP | 582944 | 2/1994 |
| JP | 60-75810 | 4/1985 |
| JP | 4-109208 | 4/1992 |
| JP | 8-75968 | 3/1996 |

* cited by examiner

Primary Examiner—Chandrika Prasad
(74) Attorney, Agent, or Firm—McDermott, Will & Emery

(57) ABSTRACT

One or more optical fiber elements each constituted by a coated glass fiber are fed to an over-coating device and an over-coating is applied to the optical fiber elements in a lump, the feeding speed of the optical fiber elements to the over-coating device is made larger than the take-up speed of the over-coated optical fiber onto a take-up reel so as to give longitudinal compression strain to the glass fibers of the over-coated optical fiber. The glass fiber has compression strain of not less than 0.03% to less than 0. 10% in a longitudinal direction thereof at room temperature.

13 Claims, 3 Drawing Sheets

OVERCOATED FIBER FOR USE IN OPTICAL FIBER CABLE

This application is a continuation-in-part of application Ser. No. 09/075,179 filed May 11, 1998 now abandoned.

BACKGROUND OF THE INVENTION

1. Field of the Invention

The present invention relates to an over-coated optical fiber used for an optical fiber cable.

2. Description of the Related Art

As such an over-coated optical fiber used for an optical fiber cable, there are generally used a single-fiber over-coated optical fiber in which an over-coating is applied onto an optical fiber element, and a ribbon over-coated optical fiber in which optical fiber elements are arranged in parallel and an over-coating is applied to the optical fiber elements in the lump.

The latter of them, that is, the ribbon over-coated optical fiber has such a sectional structure as shown in FIGS. 2A and 2B. FIG. 2A shows a four-fiber over-coated optical fiber, and FIG. 2B shows an eight-fiber over-coated optical fiber. As shown in FIG. 2A, each optical fiber element 12 is constituted by a glass fiber 11a having silica as its main ingredient and a coating 11b of UV-curable resin applied onto the glass fiber 11a. A four-fiber over-coated optical fiber 15 is constituted by four optical fiber elements 12 arranged in parallel and covered with an over-coating 13 of UV-curable resin. On the other hand, as shown in FIG. 2B, an eight-fiber over-coated optical fiber 16 is obtained in a manner so that two sets of optical fiber arrangement in each of which four optical fiber elements 12 are arranged in parallel and covered with an over-coating 13, are further arranged in parallel and an over-coating 14 of UV-curable resin is applied onto the two sets.

These over-coated optical-fibers are used mainly for optical fiber cables having such a structure as follows. FIG. 3 shows a multi-fiber optical fiber cable which has been widely used. In the multi-fiber optical fiber cable, a spacer 18 is formed by extrusion molding with a plastic material such as polyethylene, or the like, so that it has spiral grooves 18a formed around a tensile core 17 of a steel wire, a steel stranded wire, FRP or the like. Then, sets of four-fiber over-coated optical fibers 15 are received in each of the grooves 18a while being laid on each other. Finally, an upper winding 19 and a plastic jacket 20 are provided on the outer side of the spacer 18. The number of the grooves are determined in accordance with necessity, and it is not limited to five in such a case as shown in FIG. 3.

In addition, the spiral direction of the spiral grooves 18a provided in the spacer 18 may be unidirectional, or may be inversional in the longitudinal direction.

The over-coated optical fiber shown in FIG. 4 is a few-fiber optical fiber cable mainly used in the place where there is a small demand of subscribers. This optical fiber is configured so that an eight-fiber over-coated optical fiber 16 is received in a pipe 21 of a plastic material while being twisted at a pitch in the longitudinal direction, and a plastic coating 23 having tensile cores 22 of steel wire buried therein is provided on the outside of the pipe 21. A jelly mixture may be charged into a space 24 in the pipe 21 in order to ensure watertightness.

Generally, when an over-coated optical fiber is produced by using one or more optical fiber elements so that an optical fiber cable is manufactured by using a plurality of such over-coated optical fibers, tension is given to the over-coated optical fiber. Further, when the optical fiber cable is laid in a conduit line or the like, tension is further given to the optical fiber cable. The tension given to the optical fiber cable may be transmitted to the optical fiber elements in accordance with the structure of the optical fiber cable. The tension causes extensional strain in the optical fiber cable, the over-coated optical fibers, and the glass fibers.

The glass fibers in the over-coated optical fibers experience the extensional strain generated at the time of manufacturing the over-coated fibers and the optical fiber cable and the extensional strain due to the cable tension at the time of installation of the cable. The cable tension during installation is usually released after laying, therefore, the extension strain generated at the time of manufacturing remains in the glass fibers for a long-term use of the optical fiber cable.

For example, in the case of the optical fiber cable shown in FIG. 3, usually the individual over-coated optical fibers 15 must be arranged in each of the spiral grooves 18a so as not to be loosened when the over-coated optical fibers 15 are received while being laid on each other in each of the spiral grooves 18a. Therefore, the over-coated optical fibers 15 are received while being given tension, so that extensional strain remains in the respective glass fibers in the over-coated optical fibers 15.

On the other hand, in the optical fiber cable in FIG. 4, the over-coated optical fiber is received in the pipe while being twisted spirally at a pitch of, for example, about 250 mm so as to endure bending of the cable. Therefore, extensional strain is produced, because of twisting, in optical fiber elements in a position near the end of the ribbon in comparison with optical fiber elements disposed at the center of the ribbon. Extensional strain is produced also in glass fibers substantially to the same extent.

In order to make optical fiber elements endure tension and extensional strain given thereto at the time of laying the over-coated optical fiber, a screening step of giving a constant tension to the optical fiber elements and removing portions not-proof against the tension is given in the process of manufacturing the optical fiber elements. Therefore, there is a relationship that the manufacturing yield becomes smaller if this tension set in the screening step is made larger, while the manufacturing yield becomes larger if this tension set in the screening step is made smaller. Accordingly, the tension set in the screening step has an influence on the manufacturing cost.

On the other hand, it is known that the breaking endurance of the glass fiber is reduced if extensional strain is continuously given to a glass fiber for a long time, and there is a correlation between the residual extensional strain and the endurance of the glass fiber. In addition, it is known that there is another correlation between the endurance of the glass fiber and the tension set in the screening step at the time of manufacturing optical fiber elements, and if the tension set in the screening step is increased, the endurance of glass fiber is prolonged.

From those facts, when a certain goal is given to the endurance of an optical fiber cable, the larger the extent of the extensional strain residual is in glass fibers after laying of the optical fiber cable, the larger the tension set must be made in the screening step. Therefore, if the extensional strain residual in the glass fibers can be reduced, the tension set in the screening step can be reduced. Then, the manufacturing yield of the optical fiber elements can be increased correspondingly, and the manufacturing cost can be reduced.

SUMMARY OF THE INVENTION

It is an object of the present invention to solve the foregoing problem in the conventional techniques, and to provide an over-coated optical fiber in which tension set in the screening step can be reduced.

According to the present invention, provided is an over-coated optical fiber in which one or more optical fiber elements each constituted by a coated glass fiber are arranged, and an over-coating is applied to the outer circumference of the arrangement of the one or more optical fiber elements. In the over-coated optical fiber, the glass fibers have compression strain so as to be compressed in the longitudinal direction.

Further, in a method of manufacturing an over-coated optical fiber according to the present invention, the feeding speed of optical fiber elements to an over-coating device is made larger than the take-up speed of the over-coated optical fiber to thereby give compression strain to glass fibers so as to compress the glass fibers in the longitudinal direction.

DETAILED DESCRIPTION OF THE INVENTION

The present invention will be described as follows referring to the accompanying drawings.

Figure 2A:
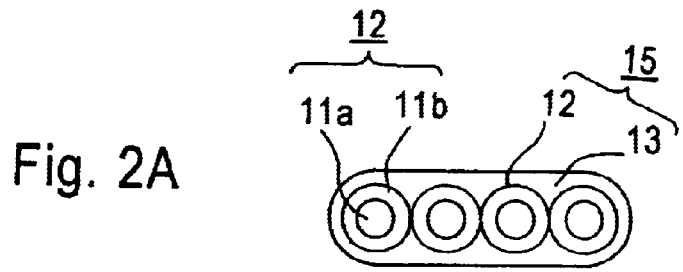
FIG. 2A is a sectional view of a four-fiber over-coated optical fiber.
Figure 2B:
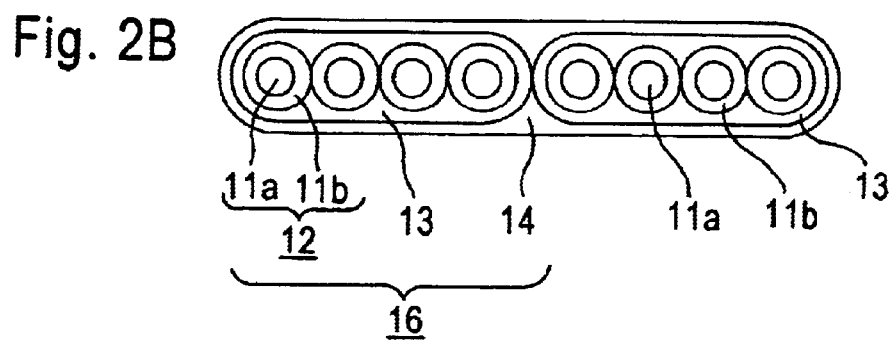
FIG. 2B is a sectional view of an eight-fiber over-coated optical fiber.
Figure 2C:
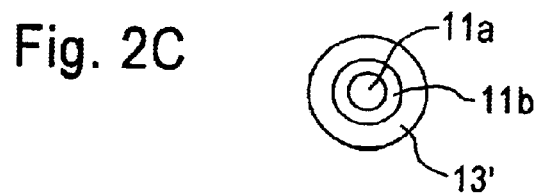
FIG. 2C is a sectional view of a single-fiber over-coated optical fiber.

The sectional shape of the over-coated optical fiber according to the present invention is not different from that of the over-coated optical fiber shown in FIGS. 2A and 2B. In addition, the present invention can be applied to a single-fiber over-coated optical fiber as shown in FIG. 2C. The single-fiber over-coated optical fiber is constituted by the glass fiber 11a, the coating 11b, and an over-coating 13'.

Specifically, the four-fiber over-coated optical fiber as shown in FIG. 2A has a thickness of 0.32 mm (320 μm) and a width of 1.1 mm. The eight-fiber over-coated optical fiber as shown in FIG. 2B has a thickness of 0.32 mm and a width of 2.25 mm. The single-fiber over-coated optical fiber has an outermost diameter of 0.9 mm.

It will be understood that the over-coated optical fiber according to the present invention has longitudinal compression strain if the glass fibers of the over-coated optical fiber are measured by a strain measuring instrument such as that according to Brillouin Optical Fiber Time Domain Analysis (hereinafter abbreviated as "BOTDA").

The measurement method based on BOTDA is that which uses the fact that the Brillouin frequency shift peculiar to a medium appears when strain is given to a glass fiber. The accuracy of measuring strain is about 0.005%. Incidentally, the compression strain of the glass fiber is substantially equal to that of the optical fiber element. This longitudinal compression strain of a glass fiber can be obtained by a difference between the value of the glass fiber in an over-coated optical fiber and the value of a glass fiber in an optical fiber element before being processed into an over-coated optical fiber or in an optical fiber element extracted from an over-coated optical fiber which is deconstructed. An average value over a portion of about 5 m is obtained as the measured value because the resolution is about 5 m.

In the present invention, in an over-coated optical fiber received in an optical fiber cable while tension is given to the over-coated optical fiber, glass fibers have longitudinal compression strain of 0.03% or more, preferably not less than 0.03% and less than 0.1% at room temperature in the form of the over-coated optical fiber, in order to make residual compression strain as small as possible. In addition, in an over-coated optical fiber which is received in an over-coated optical fiber while being twisted in the longitudinal direction without giving any tension thereto, the longitudinal compression strain of glass fibers is larger as a position goes outward from the center portion of the ribbon in order to cope with the twisting of the over-coated optical fiber.

Figure 1A:
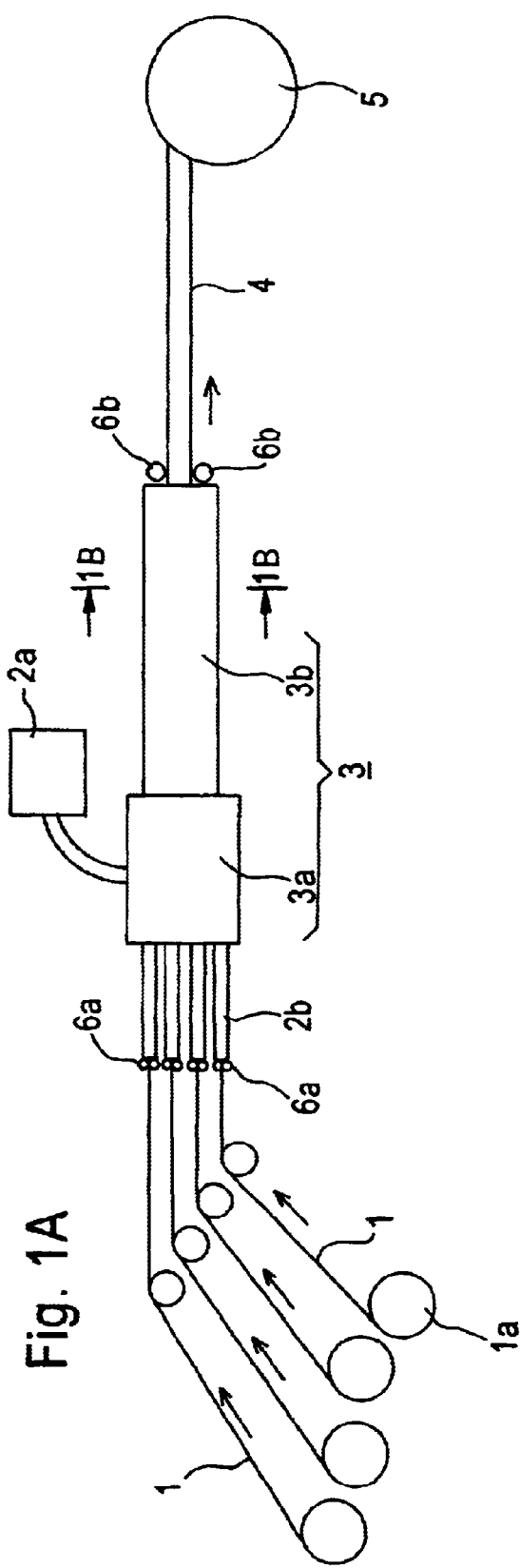
FIG. 1A is a view for explaining a process to manufacture an over-coated optical fiber according to the present invention.
Figure 1B:
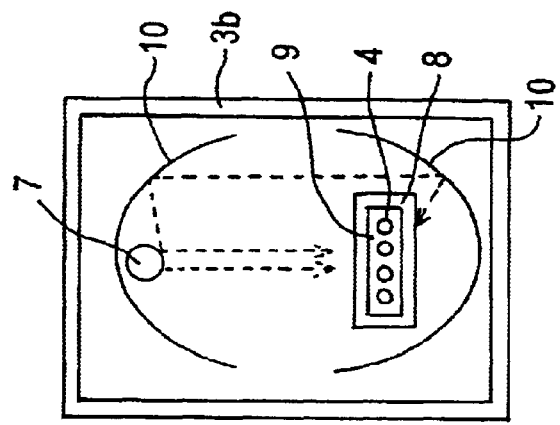
FIG. 1B is a sectional view along line I—I' in FIG. 1A.

In addition, such an over-coated optical fiber having a longitudinal compression strain is manufactured in a manner as follows. FIG. 1A is a view for explaining a manufacturing process. FIG. 1B is a sectional view taken along line I—I' in FIG. 1A. In FIG. 1A, a plurality of coated optical fiber elements 1 are fed from feed reels 1a and supplied, in a parallel arranged state, into an over-coating device 3, while their feeding speed is controlled by rollers 6a which is provided just before guide pipes 2b. The over-coating device 3 is constituted by a resin applicator 3a and an ultraviolet curing device 3b. UV-curable resin 9, which has a positive coefficient of thermal expansion, is supplied from a resin supplier 2a into the resin applicator 3a. In addition, guide pipes 2b, each having an inner diameter a little larger than the outer diameter of the optical fiber element 1, are disposed in front of the over-coating device 3 so that the optical fiber elements 1 can be guided to the over-coating device 3 without meandering.

The UV-curable resin 9 is applied onto the optical fiber elements 1 in the resin applicator 3a. As shown in FIG. 1B, the UV-curable resin 9 is irradiated with ultraviolet rays irradiating from an ultraviolet lamp 7 and reflected by a reflector 10 so as to be cured in the ultraviolet curing device 3b so that an over-coating 9 is formed to cover the optical fiber elements 1 to thereby form an over-coated optical fiber 4 as shown in FIG. 1B. In this case, the UV-curable resin 9 and the optical fiber elements 1 covered therewith are introduced by an inner tube 8. The over-coated optical fiber 4 is taken up by a take-up reel 5, while the take-up speed is controlled by rollers 6b. Here, the feeding speed of the optical fiber elements 1 is made higher than the take-up speed of the over-coated optical fiber 4 so that the over-coating formed of the UV-curable resin is cured in the condition that compressing strain is given to the glass fibers of the respective optical fiber elements 1. Accordingly, the compression strain is fixed in the glass fibers in the state where it remains in the glass fibers. Because the compression strain is not due to thermal contraction of the over-coating, the over-coating does not require a negative linear thermal expansion coefficient (e.g., as in the case of the optical fiber cable disclosed in U.S. Pat. No. 4,778,244). Therefore, the thermal expansion characteristics of the over-coating of the present invention can be made to match more closely the typically positive thermal expansion of the optical fiber.

In addition, in order to change the compression strain of the glass fibers in accordance with the position of the optical fiber elements in the over-coated optical fiber, it will go well if the feeding speed of the optical fiber elements 1 is changed in accordance with the position of the optical fiber elements. That is, the feeding speed of the optical fiber elements 1 to the over-coating device 3 is set so as to become higher as a position goes from the center portion of the ribbon toward the outer portion.

Although the aforementioned mode has shown an example of an over-coating which is formed by applying UV-curable resin onto the outside of optical fiber elements and curing the resin thereon, the over-coating may be foamed by extrusion coating of thermoplastic resin.

EXAMPLES

Optical fiber elements each having a diameter of 250 μm were prepared by coating silica glass fibers each having a diameter of 125 μm with UV-curable resin. Four optical fiber elements were arranged in parallel, and fed at a speed of 200.06 m/min, while an over-coating of UV-curable resin was applied to the optical fiber elements. Then, the coated optical fiber elements were taken up at a take-up speed of 200 m/min to thereby obtain an over-coated optical fiber.

Figure 3:
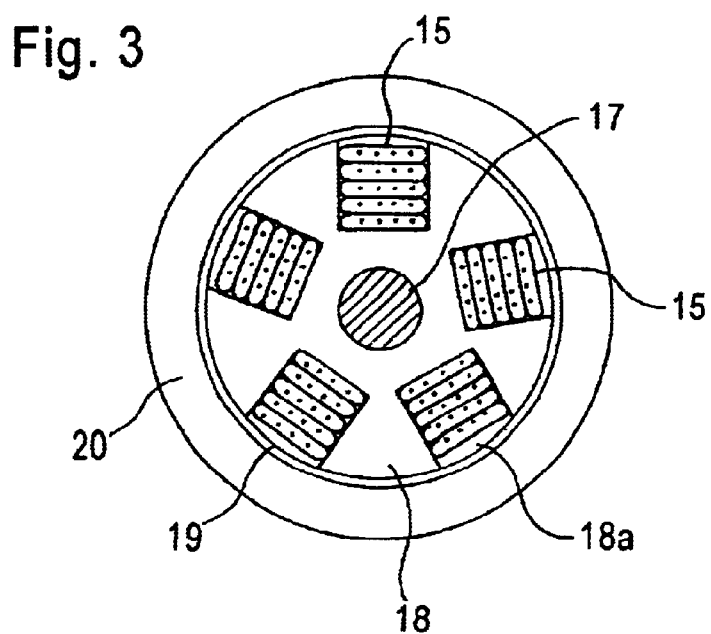
FIG. 3 is a sectional view of an example of an over-coated optical fiber.

As a result of the measurement on the over-coated optical fiber by BOTDA, the average of the longitudinal compression strain was 0.030%. In addition, an over-coated optical fiber of the type shown in FIG. 3 in which such over-coated optical fibers were received in spiral grooves was manufactured. When the over-coated optical fiber was measured again by BOTDA, it was confirmed that the compression strain thereof was substantially 0.00%, and no extensional strain was found.

In addition, a comparative example was examined in which four optical fibers were arranged in parallel, and fed at a speed of 200.04 m/min, while an over-coating of UV-curable resin was applied to the optical fiber elements. Then, the coated optical fiber elements were taken up at a take-up speed of 200 m/min. As a result of the measurement on the comparative over-coated optical fiber in a tape fiber by BOTDA, the average of the longitudinal extensional strain was 0.02% (compression strain is −0.02%). In addition, an over-coated optical fiber of the type shown in FIG. 3 in which such over-coated optical fibers were received in spiral grooves was manufactured. When the over-coated optical fiber was measured by BOTDA, the extensional strain was 0.01% (compression strain is −0.01%). This strain remains for a long time after laying.

On the other hand, by using similar optical fiber elements, a four-fiber over-coated optical fiber was obtained in a manner as follows. That is, four optical fiber elements were arranged in parallel, and fed at feeding speeds of 200.02, 200.04, 200.06, and 200.08 m/min, respectively, in the order from the end, while an over-coating of UV-curable resin was given to the optical fiber elements. Then, the coated optical fiber elements were taken-up at a take-up speed of 200 m/min to thereby obtain a four-fiber over-coated optical fiber. In addition, another four-fiber over-coated optical fiber was manufactured in the condition that the order of the feeding speeds is reversed.

Next, the two four-fiber over-coated optical fibers were arranged in parallel while the four-fiber over-coated optical fiber larger in the feeding speed was put on the outer side, and an over-coating as outer layer, consisting of UV-curable resin was given onto the two four-fiber over-coated optical fibers. Then, an eight-fiber over-coated optical fiber was obtained. In the process of this over-coating as outer layer, the feeding speed of the four-fiber over-coated optical fibers was made coincident with the take-up speed of the eight-fiber over-coated optical fiber.

As a result of measurement by BOTDA on the thus-manufactured eight-fiber over-coated optical fiber, the longitudinal compression strains of glass fibers were in ranges of 0.010% to 0.012%, 0.018% to 0.023%, 0.030% to 0.032%, and 0.040% to 0.045% in the order from an optical fiber element near the center of the over-coated optical fiber toward an outer-side optical fiber element. It was confirmed that the compression strain of the glass fiber of the outer-side optical fiber element was larger.

Figure 4:
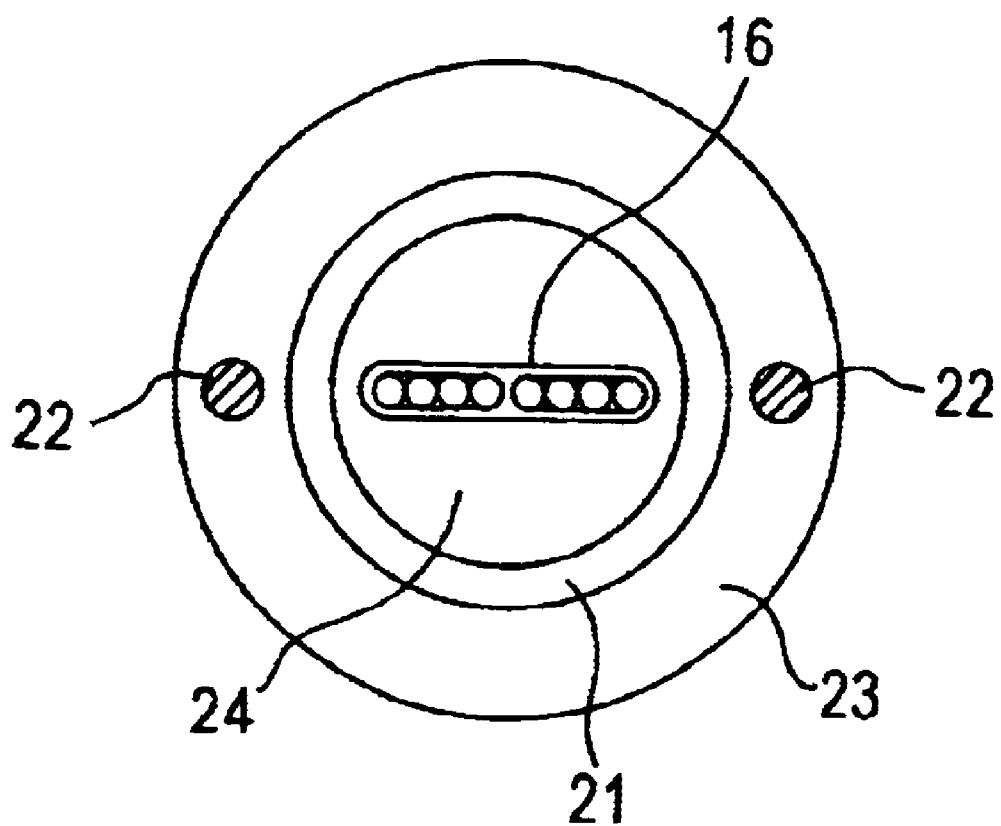
FIG. 4 is a sectional view of another example of an over-coated optical fiber.

In addition, using this eight-fiber over-coated optical fiber, an over-coated optical fiber of the type shown in FIG. 4 was manufactured by twisting the eight-over-coated optical fiber at a pitch of 250 mm. As a result of measurement by BOTDA again on the compression strains of the glass fibers of the optical fiber elements were in a range of from 0.00% to 0.015%. It was confirmed that the compression strains were averaged substantially.

Furthermore, optical fiber elements each having a diameter of 250 μm were prepared, and four-fiber over-coated optical fibers were manufactured variously under five kinds of conditions shown in Table 1. The result of measurement of the compression strains of glass fibers by BOTDA is shown in Table 1. After that, the external appearance of each of these over-coated optical fibers was observed by eye, and transmission loss was measured upon 1,000 m of each over-coated optical fiber by Optical Time Domain Reflectmeter (hereinafter abbreviated to "OTDR"). As a result, the results in Table 2 were obtained. (Abnormal external appearance means that a portion having a disordered arrangement, such as meandering or the like, was observed in optical fiber elements arranged in parallel.)

It is understood from the results shown in Table 2 that, due to excess optical attenuation caused by microbending of the optical fibers, the over-coated optical fiber manufactured under the condition of No. 4 has a transmission loss larger than that in any other one under any other condition. Therefore, it is understood from Tables 1 and 2 that it is preferable to set the compression strains of glass fibers to be made not less than 0.03% to less than 0.10%. Incidentally, the compression strains of glass fibers should be not less than 0.3% to less than 0.10% in the whole of its longitudinal direction.

TABLE 1

| Condition No. | feeding speed of optical fiber elements (m/min) | take-up speed of an over-coated optical fiber (m/min) | compression strain (%) (average) |
|---|---|---|---|
| 1 | 200.06 | 200.00 | 0.030 |
| 2 | 200.12 | 200.00 | 0.058 |
| 3 | 200.16 | 200.00 | 0.078 |
| 4 | 200.20 | 200.00 | 0.11 |
| Comparative Example | 200.04 | 200.00 | 0.020 |

TABLE 2

| Condition No. | External appearance | transmission loss (dB/Km) (wavelength: 1.55 μm) |
|---|---|---|
| 1 | good | 0.19 to 0.20 |
| 2 | good | 0.19 to 0.21 |

TABLE 2-continued

| Condition No. | External appearance | transmission loss (dB/Km) (wavelength: 1.55 μm) |
|---|---|---|
| 3 | good | 0.19 to 0.20 |
| 4 | abnormal | 0.28 to 0.31 |
| Comparative Example | good | 0.19 to 0.21 |

In an over-coated optical fiber according to the present invention, longitudinal compression strain of 0.03% or more, preferably not less than 0.03% and less than 0.1% is given to glass fibers. Accordingly, even if the over-coated optical fiber having tension given thereto is received in an over-coated optical fiber, the extensional strain of the glass fibers in an over-coated optical fiber is not increased. It is therefore possible to manufacture an optical fiber cable having an endurance as long as that of the conventional one even if tension set in the screening step in the process of manufacturing optical fiber elements is reduced. It is therefore possible to improve the yield of the optical fiber elements, and hence reduce the manufacturing cost.

In addition, when an over-coated optical fiber in which longitudinal compression strains of optical fiber elements are varied in accordance with the position of the optical fiber elements so that the compression strain of the glass fiber of the optical fiber element disposed on the outer side is made larger than that of the optical fiber element disposed at the center, is used in an over-coated optical fiber of the type in which the over-coated optical fiber is received in a pipe while being twisted spirally, the strains of the respective optical fiber elements are averaged by extensional strains given to the glass fibers at the time of twisting. Accordingly, it is possible to increase the endurance of the optical fiber cable. In addition, also in this case, it is possible to reduce tension set in the screening step to thereby reduce the manufacturing cost.

What is claimed is:

1. An over-coated optical fiber comprising:
   one or more optical fiber elements each constituted by a coated glass fiber; and
   an over-coating having a positive linear expansion coefficient applied to a circumference of said one or more optical fiber elements;
   wherein said optical fiber elements have compression strains of not less than 0.03% to less than 0.10% in a longitudinal direction thereof at room temperature.

2. An over-coated optical fiber according to claim 1, wherein said over-coated optical fiber is a ribbon over-coated optical fiber in which the optical fiber elements are arranged in parallel, and said over-coating is provided around said optical fiber elements in a lump.

3. An over-coated optical fiber according to claim 1, wherein said over-coated optical fiber is a single-fiber over-coated optical fiber in which one optical fiber element is coated with said over-coating.

4. An over-coated optical fiber according to claim 1, wherein a compression strain of said glass fiber in a longitudinal direction thereof is larger as a position goes from the center to the outer side in said optical fiber elements constituting said over-coated optical fiber.

5. An over-coated optical fiber comprising:
   one or more optical fiber elements each constituted by a coated glass fiber; and
   an over-coating applied to a circumference of said one or more optical fiber elements, said over-coating comprising a UV-curable resin;
   wherein said optical fiber elements have compression strains of not less than 0.03% to less than 0.10% in a longitudinal direction thereof at room temperature.

6. An over-coated optical fiber according to claim 5, wherein said over-coated optical fiber is a ribbon over-coated optical fiber in which the optical fiber elements are arranged in parallel, and said over-coating is provided around said optical fiber elements in a lump.

7. An over-coated optical fiber according to claim 5, wherein said over-coated optical fiber is a single-fiber over-coated optical fiber in which one optical fiber element is coated with said over-coating.

8. An over-coated optical fiber according to claim 5, wherein a compression strain of said glass fiber in a longitudinal direction thereof is larger as a position goes from the center to the outer side in said optical fiber elements constituting said over-coated optical fiber.

9. An over-coated optical fiber comprising:
   one or more optical fiber elements each constituted by a coated glass fiber; and
   an over-coating applied to a circumference of said one or more optical fiber elements, said over-coating comprising a thermoplastic resin;
   wherein said optical fiber elements have compression strains of not less than 0.03% to less than 0.10% in a longitudinal direction thereof at room temperature.

10. An over-coated optical fiber according to claim 9, wherein said over-coated optical fiber is a ribbon over-coated optical fiber in which the optical fiber elements are arranged in parallel, and said over-coating is provided around said optical fiber elements in a lump.

11. An over-coated optical fiber according to claim 9, wherein said over-coated optical fiber is a single-fiber over-coated optical fiber in which one optical fiber element is coated with said over-coating.

12. An over-coated optical fiber according to claim 9, wherein a compression strain of said glass fiber in a longitudinal direction thereof is larger as a position goes from the center to the outer side in said optical fiber elements constituting said over-coated optical fiber.

13. An optical fiber cable comprising:
   a plurality of optical fiber elements each including a coated glass fiber; and
   an over-coating applied to a circumference of one or more of the optical fiber elements;
   wherein the optical fiber elements have compression strains of not less than 0.03% to less than 0.10% in a longitudinal direction thereof at room temperature;
   wherein the over-coated optical fiber cable is a ribbon over-coated optical fiber cable in which the optical fiber elements are arranged in parallel, and the over-coating is provided around said optical fiber elements;
   wherein the compression strains of the optical fiber elements are larger for the optical fiber elements at the outer positions in the over-coated optical fiber cable than for the optical fiber elements at the center positions in the over-coated optical fiber cable.

* * * * *